United States Patent Office 3,065,021
Patented Nov. 20, 1962

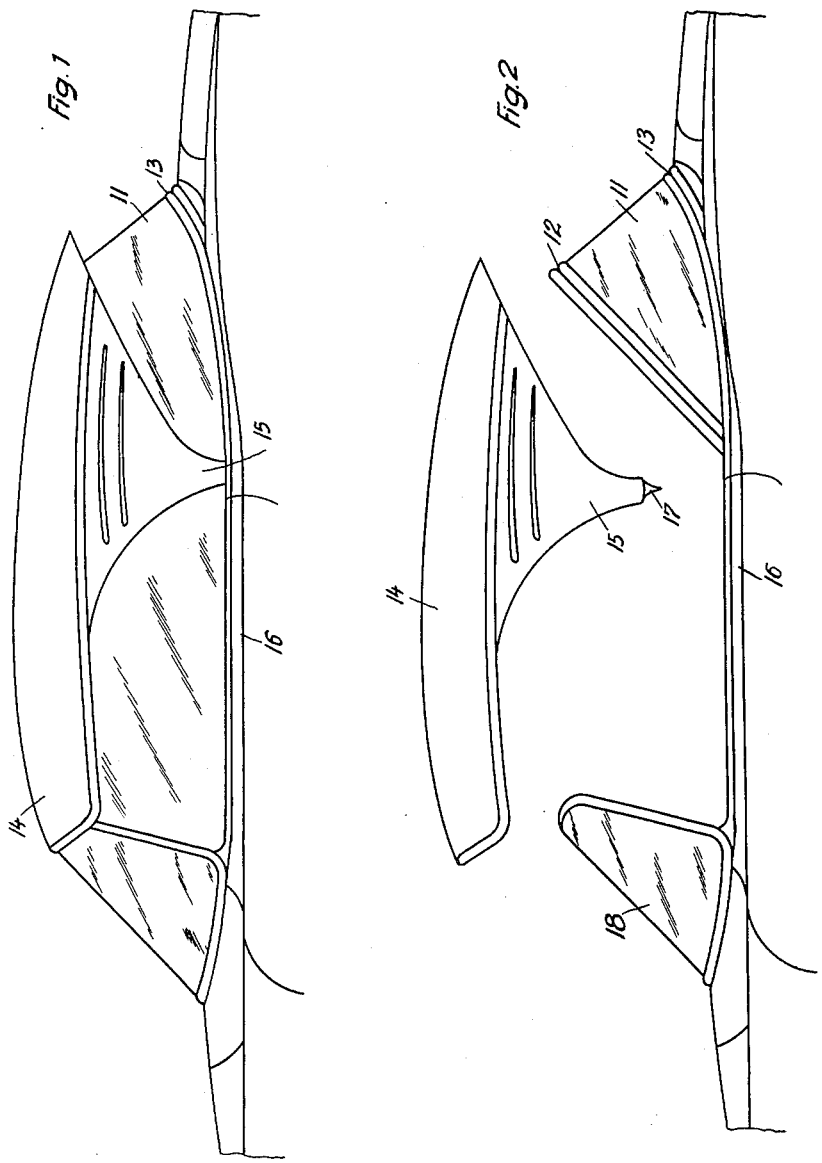

3,065,021
REMOVABLE TOP FOR MOTOR CAR BODY
Friedrich Geiger, Boblingen, Germany, assignor to Daimler-Benz Aktiengesellschaft, Stuttgart-Unterturkheim, Germany
Filed July 31, 1959, Ser. No. 830,853
Claims priority, application Germany Aug. 1, 1958
1 Claim. (Cl. 296—102)

My invention relates to a motor car body and more particularly to a body of the roadster type provided with a detachable rigid top. More especially, my invention relates to a motor car body of the roadster type provided with a foldable top and with a rigid top capable of optional use in lieu of the foldable top. When the rigid top is used, the foldable top is accommodated in folded condition within a compartment provided behind the seats, such compartment being closed by a cover mounted to lie flush with the top face of the rear end of the roadster body.

It is the object of my invention to so construct the rigid top that it may be easily mounted in position irrespective of any differences of dimensions owing to manufacturing allowances.

It is another object of my invention to provide an improved rigid top which includes a curved panorama window having lateral forwardly extending portions.

Finally it is an object of my invention to so construct the rigid top that it will not be adversely affected by deformations of the vehicle body during travel.

Further objects of my invention will appear from a detailed description of an embodiment thereof illustrated in the accompanying drawing. It is to be understood, however, that my invention is in no way limited to the details of such embodiment but is capable of numerous modifications within the scope of the appended claim and that the terms and phrases used in such detailed description have been chosen for the purpose of explaining rather than that of restricting or limiting my invention.

In the accompanying drawings:

FIG. 1 is a partial illustration of a motor vehicle of the coupé type provided with my novel detachable rigid top, FIG. 2 is an exploded view similar to that of FIG. 1 showing the top section in detached condition.

My novel motor car body is comprised of a base section 16 of the roadster type including a wind screen portion 18 and of a rigid top which may be readily mounted on the base section 16 for the purpose of converting the roadster into a closed coupé. This rigid top comprises two sections, to wit a rear section composed of a rear window pane 11 and of a frame 12, 13 and a rigid top section composed of a roof 14 and of side wall portions 15 fixed thereto. The frame of the rear window 11 is comprised of an upper frame member 12 and of a lower frame member 13. The upper frame member 12 is curved and extends along the upper edge of the rear window pane 11 and is shaped for engagement with the top section 14 which preferably rearwardly projects beyond the frame member 12 of the rear section. The frame members 12 and 13 are provided with sealing strips for engagement with the window pane 11 and for engagement with the lower face of the top portion 14, the inner faces of the wall portions 15 and the upper face of the base section 16.

If desired, ventilating apertures may be provided between the rear section 11, 12, 13 and the roof portion 14. These apertures may be formed by recesses provided in the upper sealing strip of the member 12.

In the base section 16 of the body a compartment for a foldable top (not shown) is provided behind the frame member 13 and is closed by a cover lying flush with the top surface of the tail end of the base section 16. This cover is pivotally connected to the body section 16 and, for this purpose, has forwardly projecting portions connected with the body section 16 by hinges.

The top section 14, 15 and the rear section 11, 12, 13 are detachably secured to the base section 16 for easy conversion of the coupé into a roadster. Preferably, detachable connecting means 17 are mounted on the lower ends of the side wall portions 15, for instance in the form of pins provided with spherical segments capable of engaging sockets provided in the top of the rear door posts forming part of the base section 16. The spherical segments may be held in the spherical sockets by suitable manually operable means such as eccentric buckles.

The connection of the lower frame member 13 with the base section 16 of the body may be established by lateral pins provided on the front ends of the curved frame member 13, such pins being adapted to engage the above mentioned hinges of the cover of the compartment provided for the foldable top, suitable manually operable means being provided for detachably holding such pins in engagement with the hinges and the body section 16.

A detachable connection between the upper frame member 12 and the roof section 14 can be effected by known toggle buckles of the type conventionally used for connecting the front edge of the roof portion 14 to the window screen 18.

From the above it will appear that my novel detachable top is composed of a plurality of sections, more particularly of two sections, in such a manner that the rear window together with its frame and the top section comprising the roof and the lateral wall portions constitute separate units adapted to be successively detached to and detached from the roadster body 16. Moreover, it will be appreciated that I have constructed one of these units, to wit the rear window unit including its frame, in such a manner that this unit is composed of the window pane, of the upper curved frame member coextensive with the upper edge of the pane and equipped with a resilient pane-engaging strip and with a sealing strip engaging the top section and of a lower frame member, such as 13, coextensive with the bottom edge of the window and seated on the roadster body and, more particularly, on the tail portion thereof with which it is detachably connected. The front ends of the lower frame member 13 have pins or the like adapted to be laterally introduced into the hinges of the cover of the compartment provided for the foldable top.

Particular advantages result from my invention when it is used in combination with a roof having a rear marginal portion projecting beyond the rear window. In that event no water-tight seal will be required between the frame member 12 and the roof portion 14 and the possibility is afforded of providing ventilation slots between the frame member 12 and the lower face of the roof portion 14 without requiring any particular provisions for preventing the entry of water into such ventilation slots.

Owing to the subdivision of the rigid top of the vehicle into separable units, the assembly will be considerably simplified, since each of the sections may be put in position separately from the other sections. No particular effort is required for attaching the sections to a roadster body because the upper frame member 12 and the lower face of the roof portion 14 form a simple overlapping joint. Moreover, any distorting forces that might act on the roadster body 16 during travel of the vehicle will not be transferred within the rigid top from the roof thereof to the rear window pane and vice versa. Hence, the sensitive rear window unit composed of the window pane 11 and its frame 12, 13 will not be subjected to uncontrollable forces exerted by the wide roof portion 14. On the other hand, however, the static conditions of the roof structure will be more definite in the absence of any rigid connection between the frame member 12 and the top section 14, 15.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claim.

What I claim is:

A substantially rigid, detachable roof structure for motor vehicles, especially those having only a single row of seats, comprising a rear portion including a curved panoramic window pane having forwardly extending side portions and resilient sealing strip means circumferentially encompassing said window pane and adapted to be mounted on an upper body member of a vehicle, and a rigid top section having depending integral side wall portions and at the front thereof adapted to engage the windshield of the vehicle, said top section at the rear thereof being in elastic sealing engagement with the upper sealing strip means of said rear portion and projecting rearwardly thereof, said side wall portions having means adapted to be readily detachably secured to a body member of the vehicle, said side wall portions having a configuration increasing in width in the upward direction when viewed from the side and essentially constituting the primary support means for said rigid top section whereby forces and strains developed in said rigid top section are transmitted by said side portions to the vehicle body rather than to said rear portion.

References Cited in the file of this patent

UNITED STATES PATENTS

| | | |
|---|---|---|
| 2,171,092 | Klavik | Aug. 29, 1939 |
| 2,319,002 | Kramer | May 11, 1943 |
| 2,511,460 | Cancelli et al. | June 13, 1950 |
| 2,596,355 | Ackermans | May 13, 1952 |
| 2,643,913 | Lyon | June 30, 1953 |
| 2,747,923 | McLean | May 29, 1956 |
| 2,798,763 | Dujec | July 9, 1957 |
| 2,833,593 | Olivier | May 6, 1958 |
| 2,836,457 | Beerman et al. | May 27, 1958 |

FOREIGN PATENTS

| | | |
|---|---|---|
| 263,673 | Great Britain | Jan. 6, 1927 |
| 635,325 | Great Britain | Apr. 5, 1950 |
| 463,623 | Italy | Mar. 19, 1951 |